(12) United States Patent
Wixson et al.

(10) Patent No.: US 7,843,490 B2
(45) Date of Patent: Nov. 30, 2010

(54) METHOD AND SYSTEM FOR IMAGE INFORMATION PROCESSING AND ANALYSIS

(75) Inventors: Lambert Wixson, Goldens Bridge, NY (US); Adam Aronson, Cross River, NY (US); Roger Bottum, Winnetka, IL (US); Joseph Bradley, Jackson Heights, NY (US); Julie Shimshack, Brooklyn, NY (US); Alex Gulyansky, Brookline, MA (US); Jambu Krishnamurthy, Edison, NJ (US); John Vitelli, New York, NY (US); Lalita Jetly, Piscataway, NJ (US)

(73) Assignee: Arrowsight, Inc., Mount Kisco, NY (US)

( * ) Notice: Subject to any disclaimer, the term of this patent is extended or adjusted under 35 U.S.C. 154(b) by 1439 days.

(21) Appl. No.: 10/830,099

(22) Filed: Apr. 23, 2004

(65) Prior Publication Data

US 2005/0010808 A1 Jan. 13, 2005

Related U.S. Application Data

(60) Provisional application No. 60/465,211, filed on Apr. 25, 2003, provisional application No. 60/465,212, filed on Apr. 25, 2003.

(51) Int. Cl.
*H04N 7/18* (2006.01)

(52) U.S. Cl. ...................................... 348/143; 348/159
(58) Field of Classification Search .......... 348/143–160
See application file for complete search history.

(56) References Cited

U.S. PATENT DOCUMENTS

| 5,283,644 | A | * | 2/1994 | Maeno ........................ 348/152 |
| 6,542,075 | B2 | | 4/2003 | Barker et al. |
| 6,698,021 | B1 | | 2/2004 | Amini et al. |
| 6,927,757 | B2 | * | 8/2005 | Junkins et al. .............. 345/158 |
| 7,391,907 | B1 | * | 6/2008 | Venetianer et al. .......... 382/224 |
| 2007/0132849 | A1 | * | 6/2007 | Hill et al. .................... 348/159 |

* cited by examiner

*Primary Examiner*—Andy S Rao
(74) *Attorney, Agent, or Firm*—Arent Fox LLP

(57) ABSTRACT

A method and system for remote surveillance information processing by an end user to ensure the safety of personnel, facilities and property. The user remotely accesses video streams from one or more cameras at each of a set of stores, facilities or other locations. After reviewing video streams for a specific audit item or guard tour stop, the user can input into the computer a classification of the audited video stream according to a set of predefined criteria. The user then generates a report summarizing the reviewed items and their classifications, which is transmitted to designated recipients. The present invention also includes a networked computer system for generating, performing and modifying audits and guard tours, creating guard audit reports, and providing access to the images that support the conclusions contained in the reports.

20 Claims, 17 Drawing Sheets

FIG. 4

Audit Spreadsheet 10

Audit Deep Links Creation and Reporting                    Base URL: https://qa-pub.arrowsight.com

| Instructions | | | | Audit Source: | Procedural | | | | |
|---|---|---|---|---|---|---|---|---|---|
| 1. Set the date for which the audit will be performed on | | | | Date: | 3/22/2003 | (Saturday) | | | |
| 2. Click on the 'Generate URL's' button to create deep link URLs/buttons. | | | | | | Do not edit/delete this button===== | | View Video | |
| 3. Once buttons are created, the deep links are navigated to support each audit. | | | | | | It is our template for all the buttons created dynamically | | | |
| 4. Once all audits have been performed, "UploadAuditInfo" button is used to upload data from all the sheets. | | | | | | In production this button can be hidden from users' view | | | |
| | | | | | | Reset | | | |
| 5. If exception status is changed, "UploadAuditInfo" will also update audits with that change. | | | | | | | | | |
| It is important to note, that unlike the old deep-link report generator, this one does not care about positioning. Running "Generate URL's" will cause all deep links to be updated. | | | | | | Generate URLs | | | |
| | | | | | | Upload Audit Info | | | |

| Client | Location | Device Name | Camera Name | Trans. Start | Trans. Stop | Video Start | Video Stop | URL | DT Select Vision Link | Exception |
|---|---|---|---|---|---|---|---|---|---|---|
| Disney | Lilo & Stich (JVOD/QA4, QA5) | | Lilo-Cam01 | 10:00:00 AM | 10:15:00 AM | 10:00:00 AM | 10:15:00 AM | https://qa-pub.arrowsight.com/video | View Video | Pass-on time |
| Venator | Foot Locker - Watertown, MA | | Ladies Entrance | 9:00:00 AM | 9:15:00 AM | 9:00:00 AM | 9:15:00 AM | https://qa-pub.arrowsight.com/video | View Video | Fail |
| Venator | Champs 1444B-34 St NY,NY | | Front of Store | 10:00:00 AM | 10:15:00 AM | 10:00:00 AM | 10:15:00 AM | https://qa-pub.arrowsight.com/video | View Video | Pass |
| | | | | 12:00:00 AM | 12:00:00 AM | 12:00:00 AM | 12:00:00 AM | | | ok |
| | | | | 12:00:00 AM | 12:00:00 AM | 12:00:00 AM | 12:00:00 AM | | | not audited |
| | | | | 12:00:00 AM | 12:00:00 AM | 12:00:00 AM | 12:00:00 AM | | | not audited |
| | | | | | | | | | | no video | opening / employee productivity / backroom cleanliness / Register Closing / POS Refunds-Week Guard Tour Stop/
Procedural Audit Screen 20

FIG. 11

Checklist Search Criteria Screen 30

GENERATE AUDIT CHECKLIST

CHECKLIST SEARCH CRITERIA

Please enter the search criteria for the audit checklist. All fields are required.

- Client: McDonalds
- Start Date:
- End Date:
- Previous Period: 7 days prior to start
- Total Period: 4 weeks prior to end

[Generate Checklist]

FIG. 12

Checklist Screen 40

AUDIT CHECKLIST

CHECKLIST For McDonalds

[Search Again] [E-Mail Report] [Delete]

| Audit Source | Audit Type | Location | Data | Video Start Time | Video Stop Time | Camera/Device | Transaction Start Time | Status | Last Auditor | Last Status Change | Delete |
|---|---|---|---|---|---|---|---|---|---|---|---|
| Procedural | Back Room Cleanliness | Archdale, NC | 4/2/2003 | 6:00:00 PM | 6:15:00 PM | Stock Room Delivery Door (C) | 6:00:00 PM | Pass | Shawn Anthony | 4/2/2003 | ☐ |
| Procedural | Back Room Cleanliness | Highpoint, NC | 4/2/2003 | 6:00:00 PM | 6:15:00 PM | Front Counter Cashier 3+ North (C) | 6:00:00 PM | Pass | Shawn Anthony | 4/2/2003 | ☐ |
| Procedural | Back Room Cleanliness | Thomasville Wal Mart (Intlx) | 4/2/2003 | 6:00:00 PM | 6:15:00 PM | Front Counter (C) | 6:00:00 PM | Pass | Shawn Anthony | 4/2/2003 | ☐ |
| Procedural | Closing | Archdale, NC | 4/2/2003 | 9:00:00 PM | 9:30:00 PM | Front Counter (C) | 9:00:00 PM | Not audited | Shawn Anthony | 4/2/2003 | ☐ |
| Procedural | Closing | Highpoint, NC | 4/2/2003 | 9:00:00 PM | 9:30:00 PM | Front Counter Cashier 3+ North (C) | 9:00:00 PM | Not audited | Shawn Anthony | 4/2/2003 | ☐ |
| Procedural | Closing | Thomasville Wal Mart (Intlx) | 4/2/2003 | 9:00:00 PM | 9:30:00 PM | Front Counter (C) | 9:00:00 PM | Not audited | Shawn Anthony | 4/2/2003 | ☐ |
| Procedural | Customer Service | Archdale, NC | 4/2/2003 | 7:00:00 AM | 9:00:00 PM | Drive Thru Approach (C) | 7:00:00 AM | Not audited | Shawn Anthony | 4/2/2003 | ☐ |
| Procedural | Customer Service | Highpoint, NC | 4/2/2003 | 7:00:00 AM | 9:00:00 PM | Front Counter Cashier 3+ North (C) | 7:00:00 AM | Don't know | Shawn Anthony | 4/2/2003 | ☐ |
| Procedural | Customer Service | Thomasville Wal Mart (Intlx) | 4/2/2003 | 7:00:00 AM | 9:00:00 PM | Front Counter (C) | 7:00:00 AM | Fail | Shawn Anthony | 4/2/2003 | ☐ |
| Procedural | Opening | Archdale, NC | 4/2/2003 | 7:00:00 AM | 7:15:00 AM | Front Counter (C) | 7:00:00 AM | Pass | Shawn Anthony | 4/2/2003 | ☐ |

FIG. 13

Granting access to receive Audit Email Report Screen 50

Edit User Information

| | | | |
|---|---|---|---|
| *First Name: | Adam | *Last Name: | Aronson |
| *Address: | | Apt/Unit#: | |
| *City: | | State, Zip Code: | [▼] - [ ] |
| *Daytime Phone: | 11111111 | Evening Phone: | |
| *User Group: | Foot Locker-PowerGroup ▼ | *User Status: | Active ▼ |
| *email: | julie.shimshack@arrowsight.com | Receive Audit Reports: | ☑ |

*=Required Information

FIG. 14

Report Email Recipients List Screen 60

| Add All | Remove All | | Cancel | Send Report |

To preview reports prior to sending to users: Click in the box labeled Preview Email next to the user you would like to receive the reports to review for accuracy prior to sending to users. Only one user can receive the Preview Email. The recipients for this email will receive an email report for each user that has the Receive Email box checked.

To send reports to specific users: Click in the box(es) labeled Receive Email next to the users(s) you would like to receive the reports.

To select all available users to receive the report, click Add All; to deselect users, click Remove All. Click Send Report when done.

| Preview Email | Receive Email | Name | Email Address |
|---|---|---|---|
| ☐ | ☐ | Anthony, Shawn | shawn,anthony@parentwatch.com |
| ☐ | ☐ | Aronson, Adam | adam,aronson@arrowsight.com |
| ☐ | ☐ | Bottum, Roger | roger,bottum@arrowsight.com |
| ☐ | ☐ | Bradley, Joe | je,bradely@arrowsight.com |

FIG. 15

Audit Report (Overview) Screen 70

| Audit Menu |
|---|
| Overview |
| Audit Reports |
| Audit Video |
| Print this page |

ADT Select Vision
power by Arrowsight

Client: Venator

Report Recipient: David Smith
Report Generated: 4/2/2003 3:01:56 PM

Overview

| Store Name & Location | Current Period Compliance 3/17/2003-3/21/2003 | Previous Period Compliance 3/10/2003-3/16/2003 | Average Compliance 2/21/2003-3/21/2003 |
|---|---|---|---|
| Pass | | | |
| No Stores Passed | | | |
| | | | |
| Fail | | | |
| Foot Locker - Watertown, MA | 27% | 50% | 32% |
| Champs 14448 - 34th St NY,NY | 59% | 50% | 67% |
| Average Score | 43% | 50% | 50% |
| Total Average Compliance - All Stores | 43% | 50% | 50% |

FIG. 16

Audit Report (Store Reports) Screen 80

| Audit Menu |
|---|
| Overview |
| Audit Reports |
| Audit Video |
| Print this page |

Store Reports

| Store Name & Location | Audit Procedure | Current Period Compliance 3/17/2003-3/21/2003 | Previous Period Compliance 3/10/2003-3/16/2003 | Average Compliance 2/21/2003-3/21/2003 |
|---|---|---|---|---|
| Fail | | | | |
| Foot Locker - Watertown, MA - 485 Arsenal St., Watertown MA | | | | |
| | Back Door - Evenings & Wknds | 40% | 100% | 90% |
| | Customer Service - Weekday | Not avail | 0% | 0% |
| | Opening | 0% | Not avail | 0% |
| | POS Refunds - Weekday | 40% | Not avail | 40% |
| Average compliance for Foot Locker - Watertown, MA | | 27% | 50% | 32% |
| Champs 14448 - 34th St NY, NY - 1 West 34th Street, NY NY | | | | |
| | Back Door - Evenings & Wknds | 0% | 100% | 83% |
| | Customer Service - Weekday | 60% | 0% | 10% |
| | Opening | 100% | Not avail | 100% |
| | POS Refunds - Weekday | 76% | Not avail | 76% |
| Average compliance for Champs 14448 - 34th St NY, NY | | 59% | 50% | 67% |

Audit Reports (Video links) Screen 90

FIG. 17

Store Audit Procedures

Audit Menu
Overview
Audit Reports
Audit Video

Print this page

| Store Name & Location: Audit Procedure | Monday 3/17/2003 | Tuesday 3/18/2003 | Wednesday 3/19/2003 | Thursday 3/20/2003 | Friday 3/21/2003 |
|---|---|---|---|---|---|
| Foot Locker - Watertown, MA - 485 Arsenal St., Watertown MA | | | | | |
| Back door - Evenings & Wknds | Fail | | Fail | | Fail |
| | Fail | | Fail | | Fail |
| | Fail | | Fail | | Fail |
| Customer Service - Weekday | Pass | Unexamined | Unexamined | Unexamined | Unexamined |
| | Unexamined | Pass | Pass | Pass | Pass |
| | Pass | Pass | Pass | Pass | Pass |
| | Pass | Pass | Pass | Pass | Pass |
| | Pass | Pass | Pass | Pass | Pass |
| Opening | Unexamined | Incident | Unexamined | Incident | Unexamined |
| POS Refunds - Weekday | Unexamined | Ok | Unexamined | Ok | Unexamined |
| | Incident | No Video | Incident | No Video | Incident |
| Champs 14448 - 34th St NY,NY - 1 West 34th Street, NY NY | | | | | |
| Back door - Evenings & Wknds | Fail | Fail | Fail | Fail | Fail |
| | Fail | Fail | Fail | Fail | Fail |
| | Fail | Fail | Fail | Fail | Fail |
| | Fail | Fail | Fail | Fail | Fail |
| Customer Service - Weekday | Pass | Pass | Pass | Pass | Pass |
| | Pass | Pass | Pass | Pass | Pass |
| | Pass | Fail | Pass | Pass | Pass |
| | Pass | Pass | Pass | Pass | Pass |

METHOD AND SYSTEM FOR IMAGE INFORMATION PROCESSING AND ANALYSIS

This application claims priority to applicants' U.S. Provisional Applications Ser. Nos. 60/465,211 titled USER INTERFACE AND AUDIT REPORT METHOD filed Apr. 25, 2003; 60/465,212 titled VIDEO AUDIT REPORT filed Apr. 25, 2003; and application titled VIDEO GUARD TOUR/ AUDIT REPORT PROCESS filed Feb. 13, 2004. The entirety of these patent applications is incorporated herein by reference.

BACKGROUND OF THE INVENTION

1. Field of the Invention

The present invention relates to computer systems for video security and operations management, and in particular relates to generating, executing and reporting remote video surveillance audits and guard tours.

2. Background of the Technology

It is known in the art to ensure the safety and protection of personnel, facilities and property using remote video audits and guard tours. The structure of known remote video audits and guard tours generally involves a guard/auditor monitoring remote electronic surveillance equipment from a central location. The known video audits and guard tours, however, typically require constant monitoring of communications channels to/from the remote sites by the guard or auditor at a central location and/or review of large numbers of images or clips from the remote electronic equipment over slow network connections. The disadvantages of such systems are that they are labor intensive and involve delays, operator efficiency is low due in part to lack of user-friendly machine interfaces, and report generation is cumbersome and slow. Further, the system setup must be performed in-house for each set of stores, facilities or other locations that need monitoring.

Additional disadvantages of known remote video audits and guard tours include lack of effective mechanisms allowing company management departments or other customers to view what the guard or auditor witnessed, or to receive summaries of the guards' or auditors' findings and classifications.

Furthermore, while digital video recorders have been replacing analog tape based systems as the recorders for security systems due to their increased reliability, remote viewing functionality has only recently become standard for the newer analog or digital close cable television systems. Most of the digital remote viewing products are either "point-to point" systems that require PC-based software and can only access one location at a time, or web-based digital video recorders (DVRs), each of which requires a unique web address, thus preventing single web site access to multiple units. Additionally, most of these products work with only one specific DVR brand.

The foregoing disadvantages, among others, make it difficult for corporate loss prevention departments to overcome the daunting challenge of efficiently and effectively monitoring their remote offices, facilities and stores. While companies are able to purchase surveillance equipment with some remote viewing capabilities, the currently available surveillance equipment cannot be managed from a single source. In other words, the available surveillance equipment is not networked into a single system, which in turn leads to management and administration difficulties.

There is an unmet need in the art, therefore, for improved methods and systems for remote audits and guard tours, which allow remote audits/guard tours of numerous locations, while reducing the need for constant human monitoring, increasing operator efficiency, providing user-friendly machine interfaces, and ensuring easy and fast generation of audit and guard tour reports.

There is a further need for developing a networked method and system for providing quick and easy access to video information over low bandwidth connections from all video monitoring locations on a single central website through a web browser, while at the same time seamlessly managing a plurality of users accessing numerous locations and providing capabilities for creating, executing and reporting remote guard tours and audits.

There is yet a further need in the art for an integrated application solution that provides for easy access and management of video data from numerous surveillance sites, regardless of the brand of hardware equipment used.

There is yet a further need for developing remote video audits and guard tours that provide effective mechanisms which allow company management departments or other customers to view what the guard or auditor witnessed and to receive summaries of the guards' or auditors' findings and classifications.

There is a further need in the art for developing a networked method and system for remote video audits and guard tours, which would eliminate the need for performing in-house setups for the sets of stores, facilities or other locations that need monitoring.

SUMMARY OF THE INVENTION

The present invention relates to a process for creating and performing audits and guard tours, and for generating audit reports and other types of reports for stores or other facilities, using video or other image information. For example, the present invention provides a software based method and system that allows generation, execution, modification of audits and guard tours, and creation of audit and guard tour reports, and provides access to the images to develop and support the conclusions contained in the reports.

In one embodiment of the present invention, for example, the system includes a computer connected to a network for generating and/or performing remote video audits and guard tours, and for creating reports and viewing supporting images. A plurality of DVRs is connected to a network for transmitting images from selected locations for use by a plurality of users. A server is connected to the network for storing the audit reports and facilitating access to the supporting images. A video storage device is connected to the server or the network for storing and transmitting requested images.

In one embodiment, remote audits of stores and/or other locations are performed periodically, for example, to minimize theft and stock shrinkage, and to ensure compliance with established procedures. By making a specific selection, the user/auditor may automatically be presented with still image camera shots from a plurality of stores or other locations. The auditor is able to quickly and easily select locations and cameras, particular dates and times, and set up page layouts with the number of still images per page. Periodic audits are used, for example, to minimize theft and to ensure compliance with established procedures.

In one embodiment, for the guard tour feature, a guard remotely accesses video streams from one or more cameras at each of a set of stores, facilities or other locations. The guard selects a guard tour, enters a new guard tour by selecting an existing tour name, or selects individual tour stops from a list of available cameras/tour stops. After reviewing video streams from a specific tour stop, the guard may input into the computer particular failure modes for the respective tour stop. The guard/auditor examines video streams from each stop on a guard tour according to a set of predefined criteria. Based on the examination, the guard classifies the audited video stream as either passing or failing the set of predefined criteria.

The method of one embodiment of the present invention further includes creating a periodic audit report, such as a daily audit report, summarizing the audit items and their classifications. The periodic reports are collatable into a summary report using predetermined or client selected criteria that may include comparing the current audit results to previous results. The collated report is reviewed, for example, to verify the accuracy of the audit or to verify that all audits are complete. The final report is then transmitted to designated recipients.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

In the drawings:

FIG. 4 provides an example of an audit spreadsheet created for procedural and data audits used in an embodiment of the present invention;

FIGS. 11-17 provide examples of screen shots/windows that may be displayed during the process shown in FIG. 10.

DETAILED DESCRIPTION

The present invention provides a method and system for remotely generating, executing and reporting audits and conducting guard tours, which, among other advantages, require less need for human monitoring, ensure increased operator efficiency, provide a user-friendly machine interface, and allow easy and fast generation of reports and audits.

Further, the present invention provides a networked method and system for creating, executing and reporting remote audits/guard tours, which provide quick and easy access to video information over low bandwidth connections from multiple video monitoring locations on a single website through a web browser. At the same time, method and system of the present invention seamlessly manage numerous users accessing a plurality of locations, provide capabilities for creating, executing and reporting remote guard tours and audits, and eliminate the need for performing in-house setups for each set of stores, facilities or other locations that need monitoring.

A further advantage of the present invention is that it provides effective mechanisms which allow company management departments or other customers to view what the guard or auditor witnessed and to receive summaries of the guards' or auditors' findings and classifications.

Yet another advantage of the present invention is that it provides an integrated network application solution that provides for easy access and management of video data from numerous surveillance sites, regardless of the brand of hardware equipment used.

The present invention contains features that address the following areas, among others: 1) an integrated network solution for remote video audits and guard tours; 2) remote video audit functions; 3) remote guard tour functions; 4) user interface functions; and 5) report generation functions.

Example embodiments will now be described in conjunction with the appended figures.

Integrated Network Solution for Video Audits and Guard Tours

Figure 1:
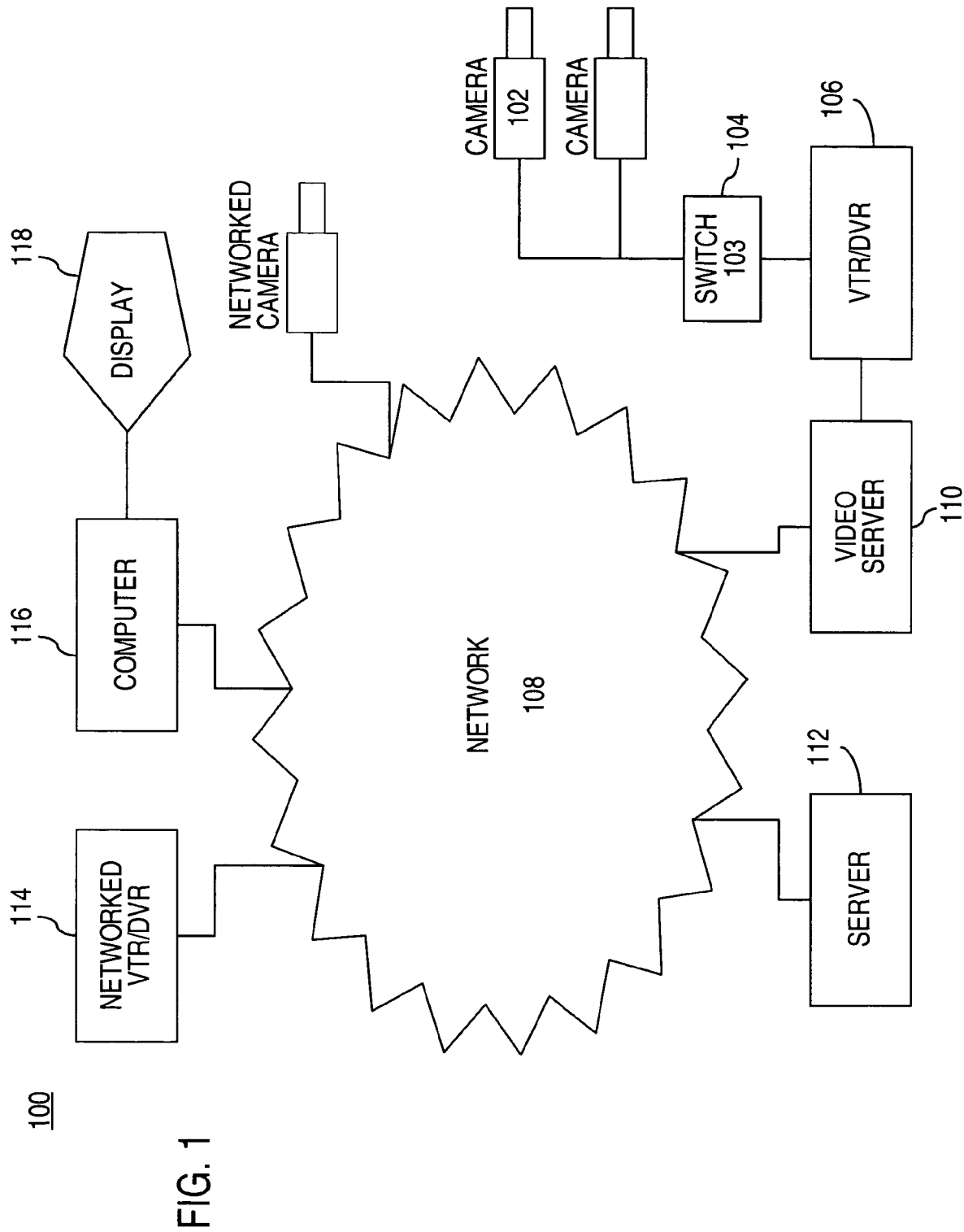
FIG. 1 shows various features of an example networked computer system, including various hardware components and other features for use in conjunction with an embodiment of the present invention.

FIG. 1 shows a high-level functional block diagram illustrating the interconnections between various components that may be utilized in the networked computer system in accordance with an example embodiment of the present invention. The system 100 of this embodiment includes a computer 116 connected to a network 108 for guard tour creation and execution, as well as for generating and/or viewing audit reports and supporting images. A server 110 is connected to the network for storing the generated tours and audit reports and for facilitating access to the supporting images. A video storage device 106 is connected to the server 110 or the network 108 for storing and transmitting requested images.

A user using a display 118 and a computer 116 connected to a network 108, such as the Internet, may create guard tours and audits of still and/or video images recorded by one or more cameras 102 on a videotape recorder (VTR) or DVR 106 and/or a video server 110, or on a networked VTR/DVR 114. After reviewing the images, the computer user indicates whether predetermined criteria were met. Based on this examination, the computer user classifies, for example, the collected video as pass or fail for auditing or guard tour purposes. Other classifications are also possible, such as, Unclassified, Pass, Fail, No video, or Don't know, in the event the guard/auditor is capable of viewing the video but for some reason cannot determine its classification. In one embodiment, the video is live or real-time video. In other embodiments, the video may be time delayed or include recorded video. In such embodiments, the guard tour corresponds to a procedural video audit.

In order for the user to efficiently review large numbers of images or clips from VTRs/DVRs 106 or 114 over slow network connections, it is advantageous in some embodiments to implement an automated system for pre-fetching these images or clips. Such a system retrieves this data from the VTR/DVR 106 and stores it onto a proxy server 112 that a user (e.g., auditor or client) can access via a fast network connection. This retrieval and storage is performed using knowledge of the video location, camera, and time parameters that the user will wish to examine in the future. The user's requests for video data flow through this proxy server 112 so that if the proxy server has retrieved the data already, the data can be provided to the viewer without forcing the user to wait for the data to travel over the slow connection. In this manner, the user can proceed efficiently without waiting for slow downloads.

The results of the audit may be stored on computer 116 or uploaded to server 110 for access by other individuals when the audits are completed. After a predetermined period of time, for example, a group of audit reports may be reviewed, collated and compared against prior audits, and an audit package may then be sent to the client, preferably as a single email attachment. Due to security and/or privacy concerns, in one embodiment, an email attachment to a particular recipient will include only links to video resources that the recipient is authorized to view.

The system 100 provides one or more cameras 102, which may be still or video cameras, connected to a networked VTR/DVR 114 or to VTR/DVR 106, in turn connected to video server 110. In the event a plurality of cameras is connected to a single VTR/DVR 106, these cameras are typically connected via one or more switches 104. The VTR/DVR may be connected directly to the network 108 or to a video server 110. These connections allow access to live video or video images stored on VTR/DVR 106 or the networked VTR/DVR 114.

When performing a guard tour or audit, a user viewing display 118, which is typically connected to computer 116 to permit access to network 108, may access server 110 to generate/select a guard tour or obtain the audit records. The computer 116 may also use the network 108 to access the supporting video or saved video clips. The video or video clips may be accessed directly from the camera 102 via VTR/DVR 106, or from video server 110. The server 110 may be a web server.

Figure 2:
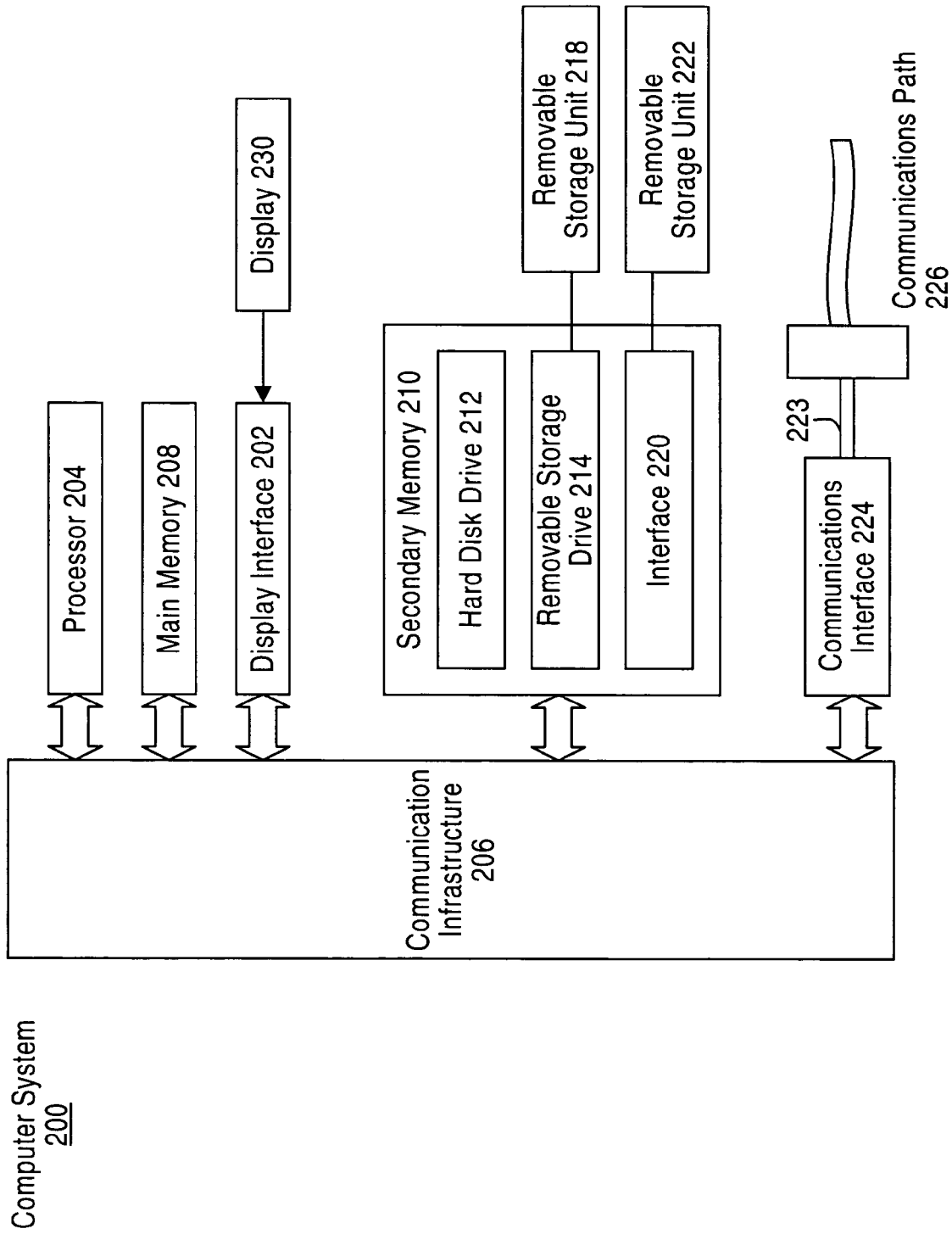
FIG. 2 presents an exemplary system diagram of various hardware components and other features, in accordance with an embodiment of the present invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 2.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

Remote Video Audits

The video audit functions of an embodiment of the present invention may be directed to, for example, the detection of procedural and/or material omissions in stores, offices, and manufacturing or other facilities, such as poor management, as well as internal and/or external theft.

The video audit functions of one embodiment, for example, permit users to focus on specific events before downloading video files of large bandwidth. In addition to making video searches effortless and intuitive, this feature allows the user to request, for example, a set of stills, which require relatively little bandwidth, and therefore less time to download, before deciding to request an entire video clip.

Figure 3A:
FIG. 3A shows an example of still video images used in the remote video auditing function of the present invention.

An example screen shot of the present invention, as illustrated in FIG. 3, provides the user/auditor with still images spanning a relevant period of time. In the example of FIG. 3, a cash bag disappears from an office during a 12 hour period. Downloading and watching 12 hours of video would waste the auditor's valuable time and would not be possible using low speed telephone lines. The still images illustrated in FIG. 3, however, provide the auditor with an opportunity to focus the relevant review time to a shorter period, during which the system may provide additional still images over a shorter time frame. This process may be continued until the auditor is presented with a small enough period of time to allow for a fast and easy video download. By reviewing the still images shown in FIG. 3, the user/auditor is able to determine that the cash bag disappeared from the top of the safe between 6:21:00 and 6:21:26 and to quickly and easily download the 26 seconds of video to determine what actually occurred.

In operation, a user is presented with still image camera shots from one or more stores or other locations. The user is then able to quickly and easily select locations and cameras, particular dates and times and set up page layouts with the number of still images per page to begin the audit.

In one embodiment, the set of stores, facilities or other locations, the time intervals, cameras, devices mapping to cameras, and other criteria to be examined, known as audit items, are stored in an audit execution checklist, also known as an audit spreadsheet. For each audit item, the user is able to select a button or hyperlink in the audit spreadsheet to view the video that is needed for examination and/or classification.

Figure 3B:
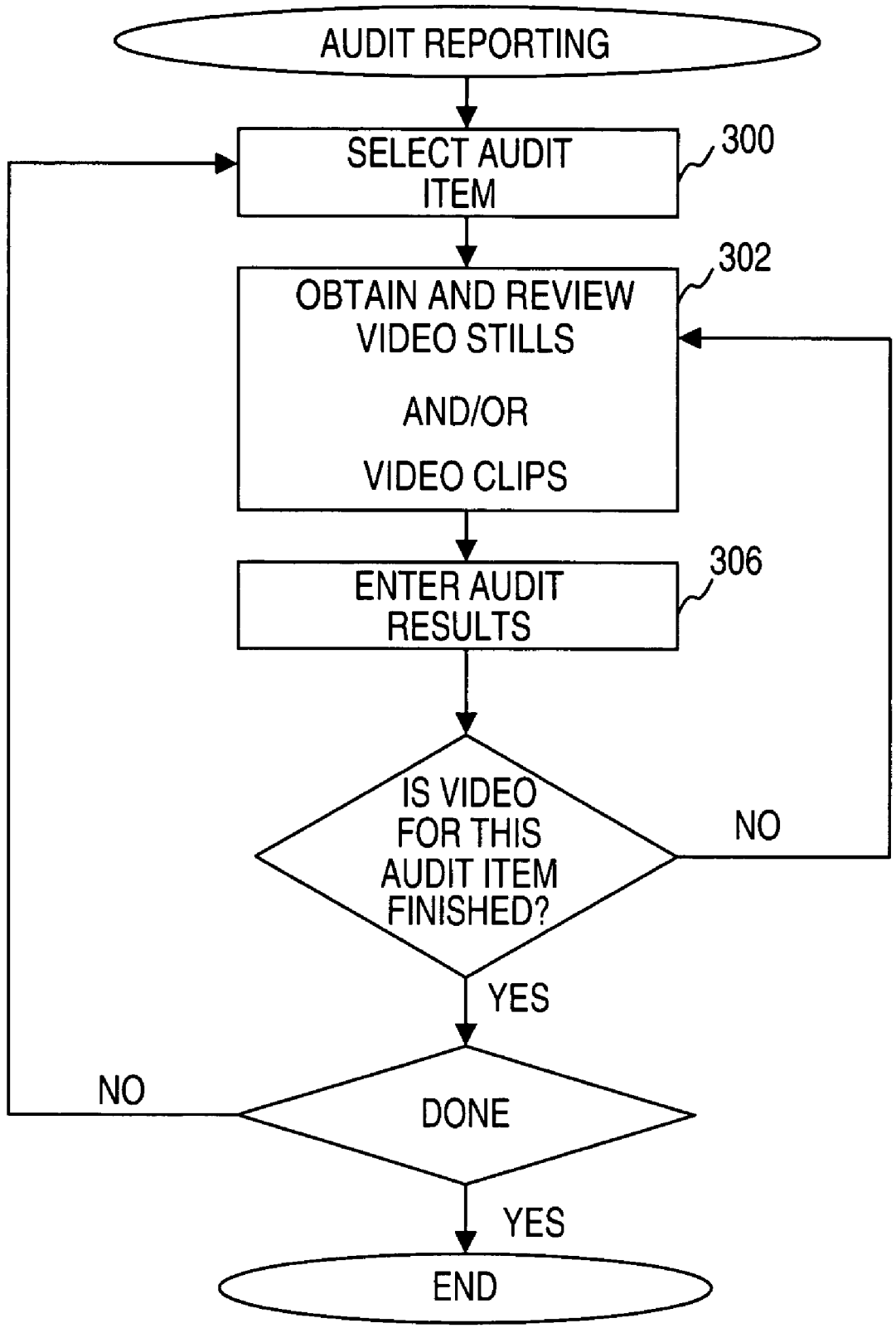
FIG. 3B presents an example flow diagram of functions performed for audit execution and reporting in accordance with an embodiment of the present invention.

As exemplified in FIG. 3B, initially, the auditor may select an audit item to review 300. After selecting the audit item, the auditor may, for example, choose to view video stills or video clips for the audit item via a hyperlink. In addition, a particular time period for obtaining video stills may be selected 302. At this point, the auditor reviews the video stills shown on the screen, as shown, for example, in FIG. 3A.

After obtaining and reviewing the video stills 302, the auditor narrows down the time period of interest and downloads, as necessary, only the relevant video clips of interest.

Thereafter, the auditor indicates a pass or fail for the particular review (e.g., Closing Procedure; Backroom Cleanliness; Merchandise Return) using the audit choices provided 306. The audit choices may include, for example: Unclassified, Pass, Fail, No video, or Don't Know, in the event the auditor is capable of viewing the video but for some reason cannot determine whether it is a pass or a fail. Optionally, a text box or other device is presented, which allows the auditor to enter a free text message that indicates other reasons for concern and/or failure of the audit regarding the particular audit item.

After entering the audit results 306, the auditor may proceed to the next audit item by, for example, selecting a next audit item button or entering an associated keyboard shortcut. Alternatively, the auditor may proceed or return to the previous audit item by using a button and/or keyboard shortcut for that purpose. When a particular audit item is completed, the auditor may select an audit item, repeat the preceding audit item or end the audit item review.

In one embodiment, the remote video audits may be Data Exception Audits and Procedural Audits, among others. Each audit item in a Data Exception Audit corresponds to a "transaction" or "event" that has been identified by another data processing or data mining component. Examples of Data Exception Audits include Point of Sale (POS) exceptions itemized by POS monitoring software, Electronic Article Surveillance (EAS) management events itemized by EAS pedestals located at store exits, and unauthorized early openings, as itemized by a burglar alarm panel. As an illustration, a POS exception audit could focus on transactions (primarily fraudulent merchandise returns) at the cash register that, due to their profile, generate exceptions. Observations would include whether there was an actual return of merchandise associated with the POS transaction and, specifically, whether a customer was actually present at this register for the return.

In another example, procedural audits focus on compliance with established store procedures. Audit items in procedural audits correspond to predefined cameras at predefined times. These are typically examined periodically, such as on a daily basis. Illustrative procedural audits include Closing Procedures, Customer Service, Backroom Cleanliness and Employee Productivity. The Closing Procedure audit may, for example, focus on whether proper closing procedures are observed at the scheduled closing time for the store. The Closing Procedure audit verifies whether the staff was working, whether any non-employees were present and whether employee's bags were checked upon leaving the store.

FIG. 4 shows an example of an audit spreadsheet created for procedural and data audits. Each tab at the bottom of the audit spreadsheet represents a different type of audit. In the screen shot shown in FIG. 4, each audit spreadsheet is predefined with Client, Location, Camera/Device, Transaction Start Time, and Transaction Stop Time. For procedural audits that are performed periodically, such as on a daily basis, the user enters the date of interest in the spreadsheet cell near the top of the page. For data driven audits, the user typically exports the location, camera/device, transaction start time and transaction stop time from the user's data mining software and imports it into the spreadsheet. To examine and classify the audit items, the user resets the spreadsheet by selecting the Reset button, and creates video links by selecting the Generate Uniform Resource Locator (URL) button. Each video link is a single Hyper Text Transfer Protocol (HTTP) URL that allows a web browser to provide a user with access to a web page via the central web site that displays the video from the specified location, camera, start time and stop time, without requiring any information from the user, other than, for example, a username and password.

As further illustrated in FIG. 4, each row on the spreadsheet represents a different location and/or camera. The user is able to view the video information for each row by selecting the View Video button, which invokes a browser that follows the URL link to the video. The user then makes a determination as to whether the selected location/camera passes or fails the audit. In the Exception column, the user may select, for example, one of the following as the appropriate status: Pass, Fail, Not Audited, Don't know, or No video.

After reviewing all audits, the user uploads the information on the central web site by selecting the Upload Audit Info button. The data is then stored at the central web site for a predetermined period of time, for example.

Figure 5A:
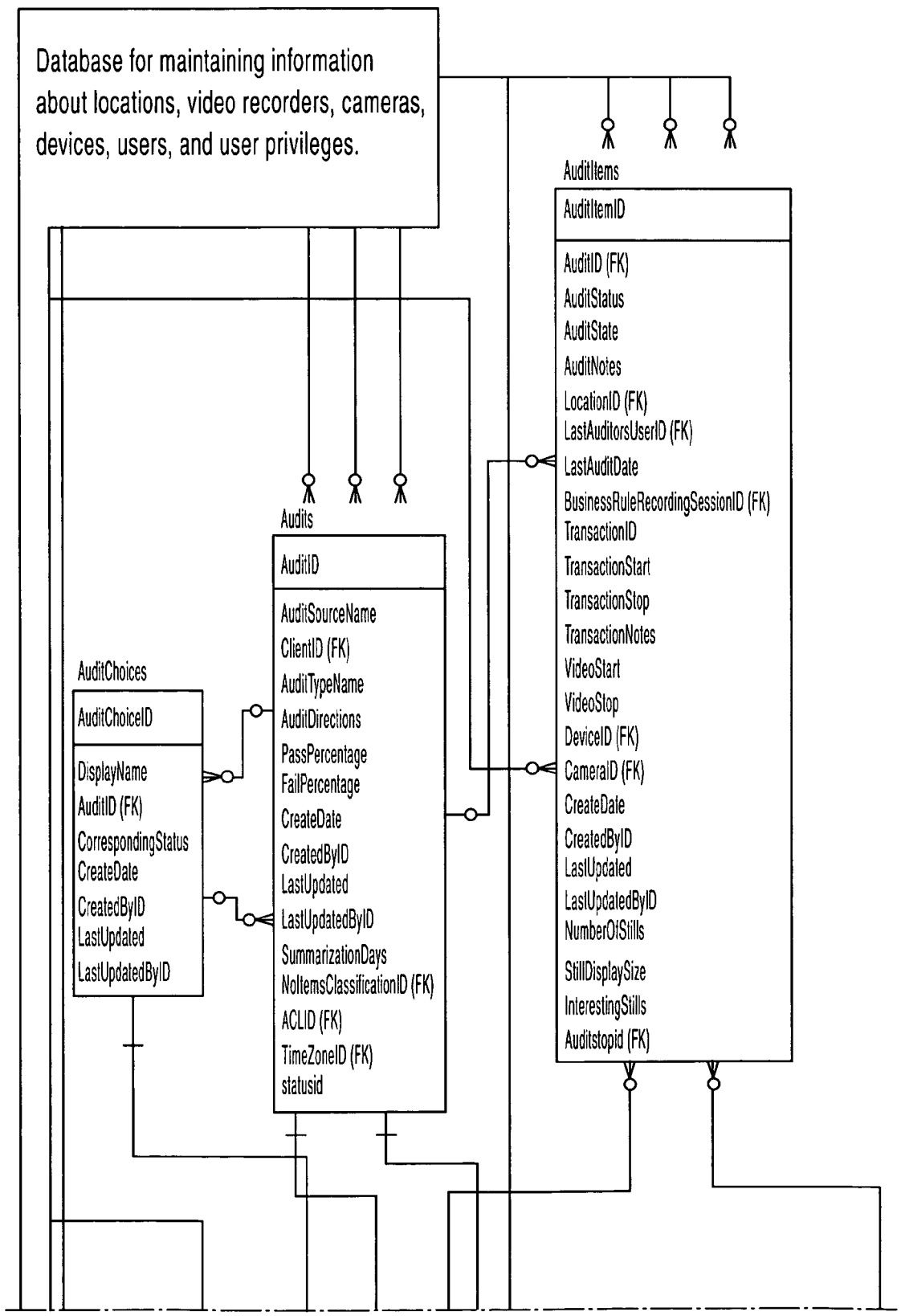
FIG. 5 illustrates examples of the data objects and their interrelationships in accordance with an embodiment of the present invention.
Figure 5B:
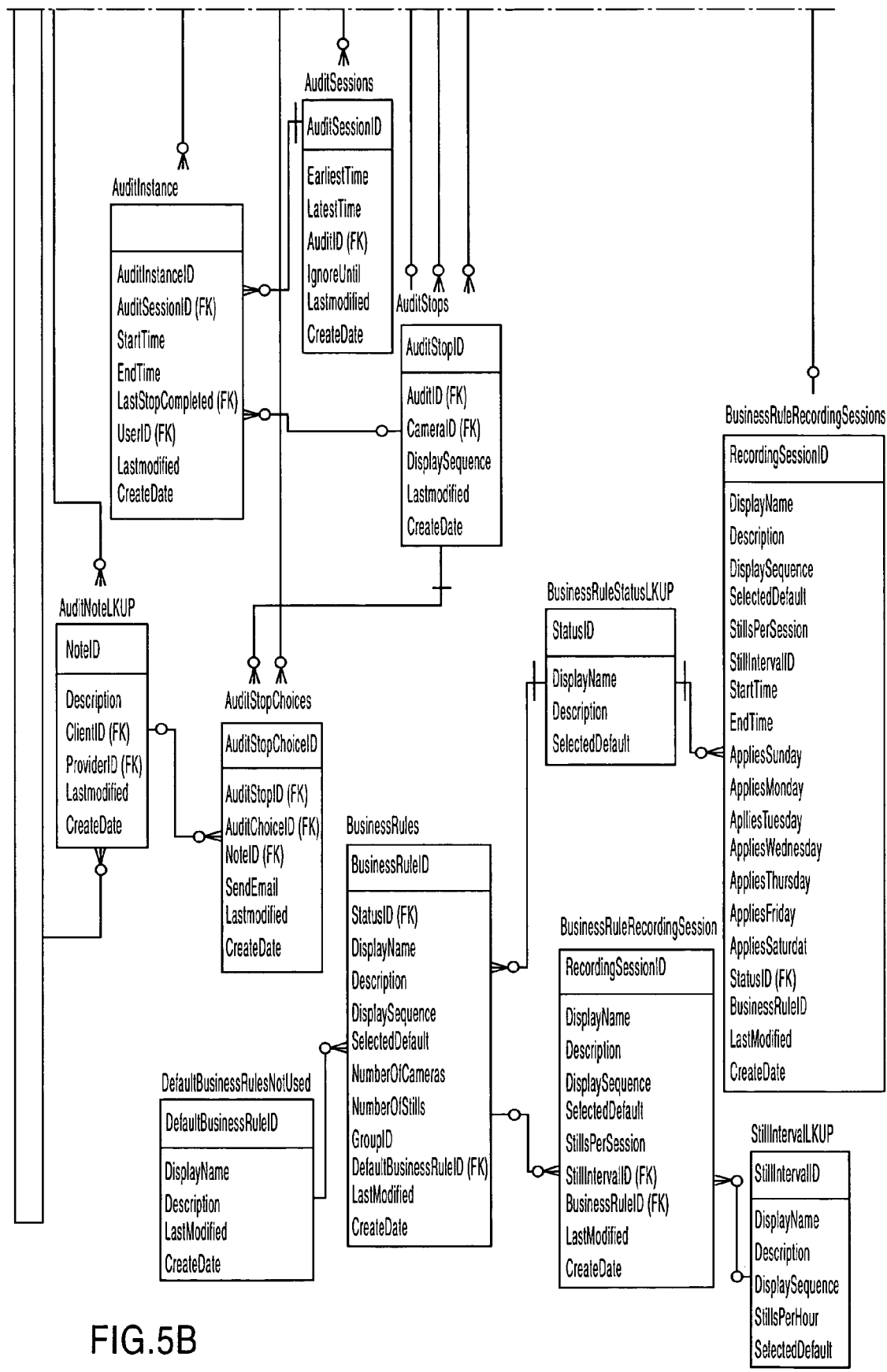

FIG. 5 illustrates exemplary data objects and their interconnections that may be utilized in generating and performing a procedural audit.

Remote Guard Tours

An exemplary illustration of the remote guard tour feature of an embodiment of the present invention will be discussed.

Figure 6:
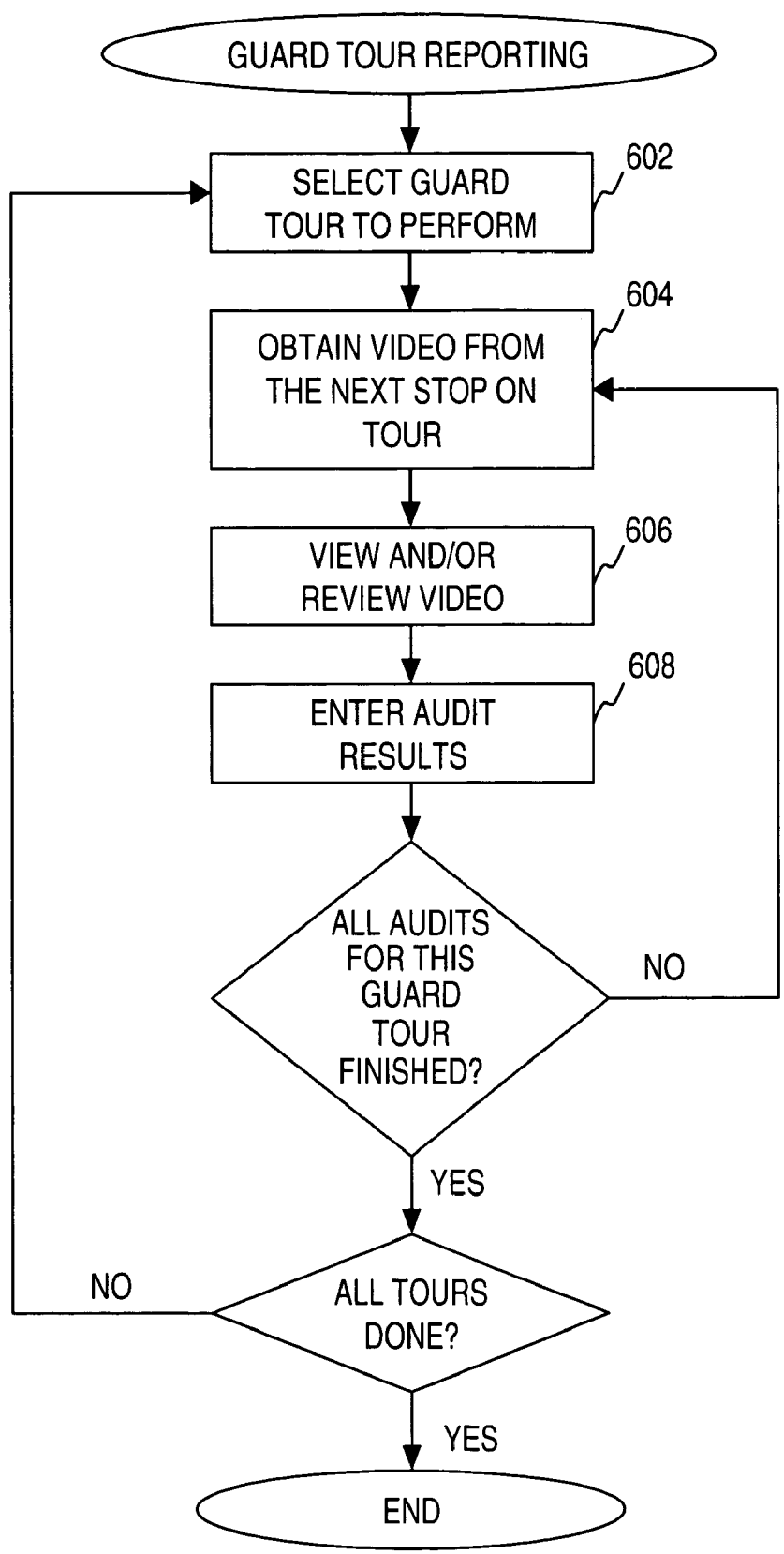
FIG. 6 presents an example flow diagram of functions performed for guard tour execution and reporting in accordance with an embodiment of the present invention.
Figure 7:
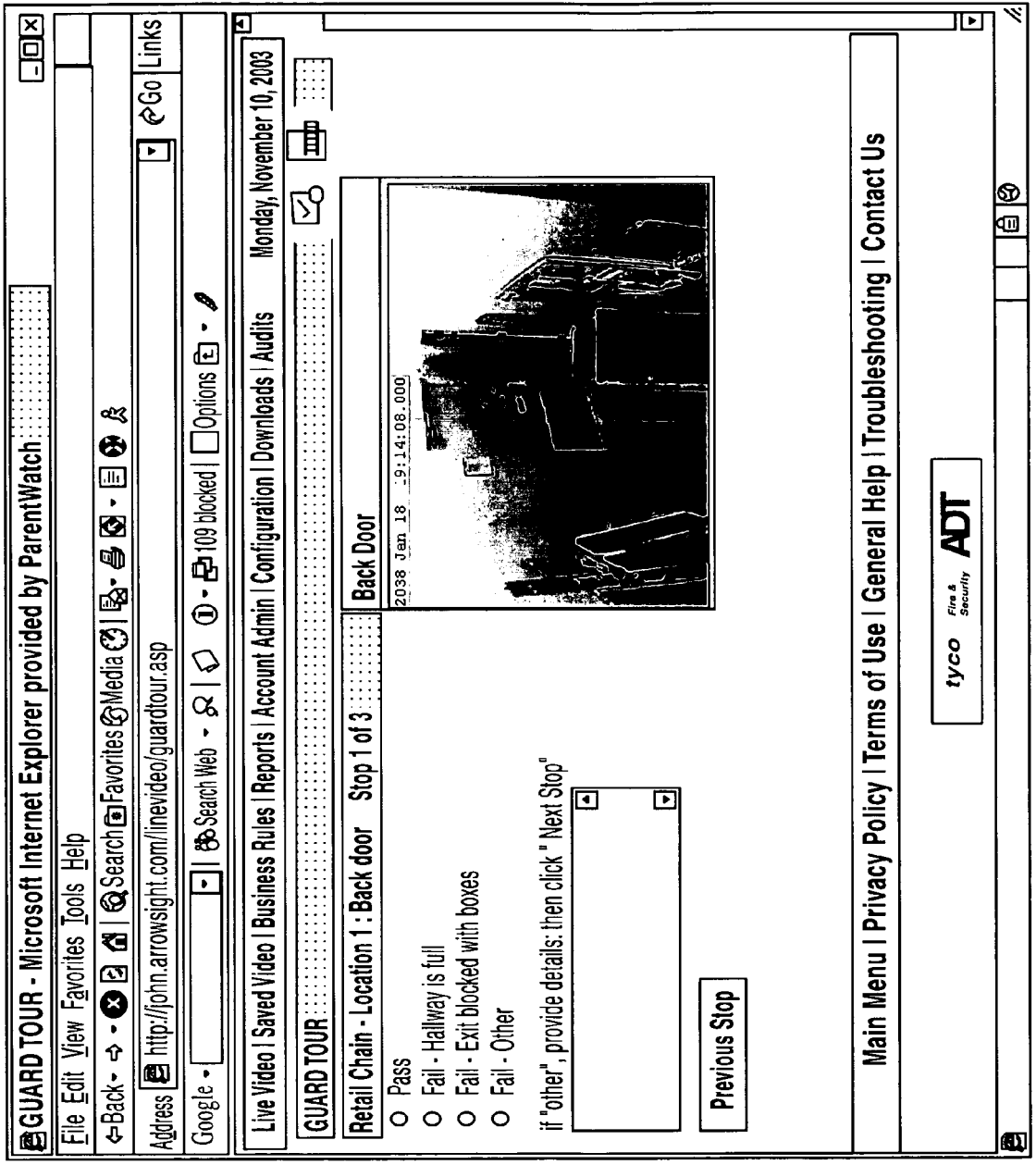
FIG. 7 provides an example of a screen/window that may be displayed at one guard tour or procedural audit stop in accordance with an embodiment of the present invention.

As exemplified in FIG. 6, initially, the guard may select a guard tour to perform 602. After selecting the tour, a particular location may be selected. Guard Tour Stop/Procedural Audit Screen 20 shown in FIG. 7 illustrates a back door as the selected location. Thereafter, the guard reviews the video shown on the screen 606. This video may be live or real time video or may be a time-delayed video, or may include a prerecorded video clip that the guard may play for review.

Figure 8:
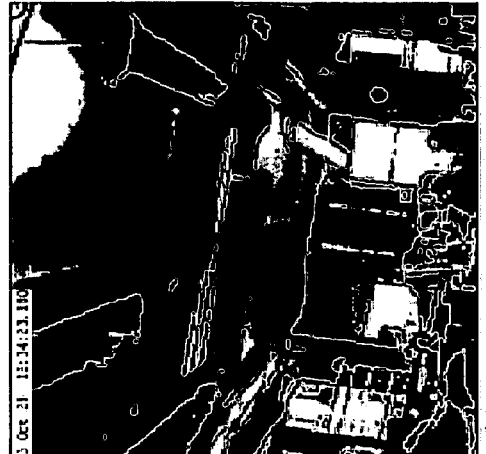
FIG. 8 provides an example of a screen shot/window that may be displayed while creating a guard tour in accordance with an embodiment of the present invention.

After reviewing the video 606, the guard indicates a pass or fail for the particular review (e.g., Back Door Secured; Hallway Clear) using the audit choices provided 608. The audit choices may include, for example: Unclassified, Pass, Fail, No video, or Don't Know, in the event the guard/auditor is capable of viewing the video but for some reason cannot determine whether it is a pass or a fail. The audit choices 608 may be accompanied by predefined notes about the reasons for the classification. For example, the audit choice Fail may be accompanied by a specific reason for the failure, such as, Fail—Suspicious Person Present, Fail—Door Propped Open, and others. As illustrated in FIG. 8, an optional text box or other device may also be provided, which allows the guard to enter a free text message that indicates other reasons for concern and/or failure of the audit at that particular guard tour location.

After entering the audit results 608, the guard may proceed to the next stop by, for example, selecting a next stop button or entering an associated keyboard shortcut. Alternatively, the guard may proceed or return to the previous stop using a button and/or keyboard shortcut for that purpose. When a particular guard tour is completed, the guard may select a new guard tour, repeat the preceding guard tour, or end the performance of guard tours.

Figure 9:
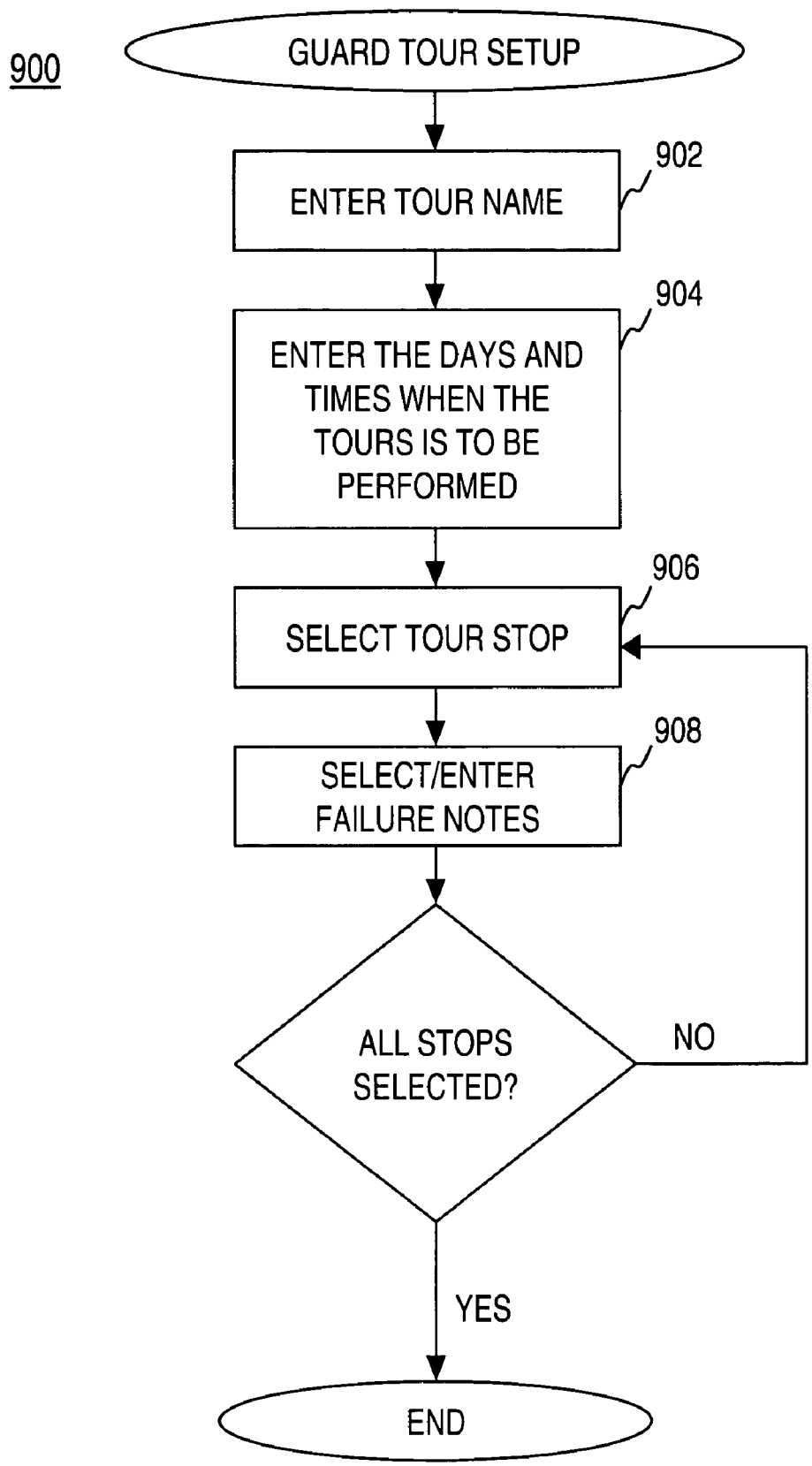
FIG. 9 presents an example flow diagram of functions performed in creating guard tours in accordance with an embodiment of the present invention.

In another illustrative embodiment, as shown in FIG. 8, an exemplary screen shot of a graphic user interface (GUI) may be used to generate, select or modify a guard tour or other function, such as an audit, using the process 900 illustrated in FIG. 9. If the goal is to create a new guard tour, for example, a new tour name is entered 902. If the goal is to modify an existing guard tour, the guard tour name that will be modified is entered 902. Optionally, the time span of when the guard tour is to be performed may be entered and a time zone selected 904. Individual tour stops may be added 906 by selecting from the available cameras in the left-hand panel and selecting the add button as shown in the screen shot of the GUI of FIG. 8.

In one embodiment, the left-hand panel of the GUI screen of FIG. 8 contains a list of cameras organized hierarchically by customer and location. Tour stops may be added or deleted by, for example, selecting the tour stop as an active tour stop and selecting the add or delete button. In addition to using a mouse or other input device, including keyboard shortcuts as known in the art, may be used. Alternatively, tour stops may be selected by entering the name, location or Internet Protocol (IP) address of a particular camera to be utilized in the tour stop.

After adding and reviewing a tour stop in this embodiment, the guard/auditor may note particular failure modes. For example, if footage from a camera directed to an emergency exit door indicates that the door is blocked, a failure note of: Emergency Exit Blocked is appropriate. Similarly, if the emergency exit is normally closed, a second failure note indicating that the emergency exit is open may also be appropriate. After entering the failure note(s), the user may select the add button or enter the respective keyboard shortcut to add the failure note. If a failure note is to be deleted, the delete button or appropriate keyboard shortcut may be used. While not required, it is preferable that a video sample from the particular camera for which the failure notes are generated is displayed so that appropriate failure notes may be selected, created and/or deleted 908. After all the tour stops (cameras) for a particular guard tour have been selected 906 and failure notes entered for each camera 908, if appropriate, the guard tour generation is complete.

Report Generation

Figure 10:
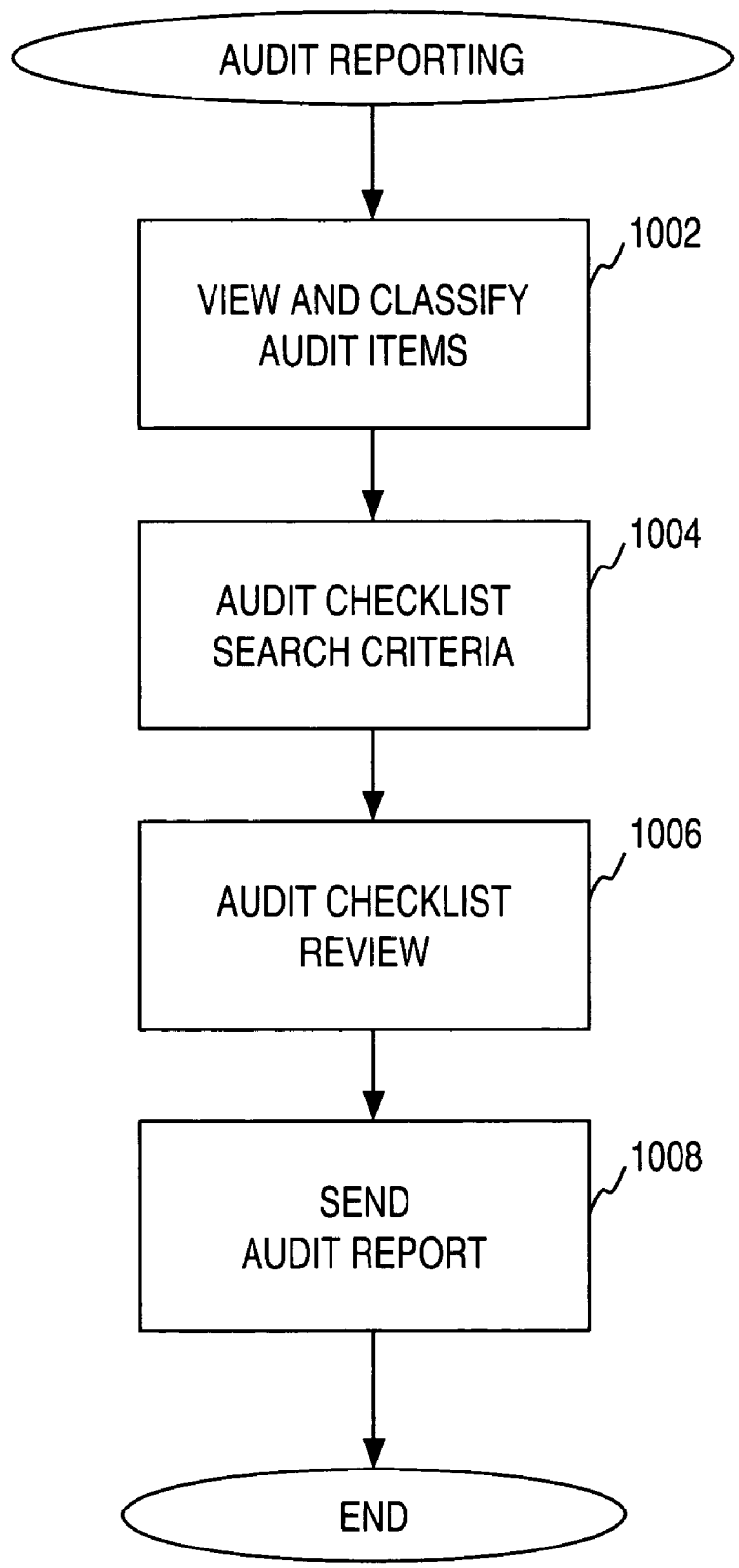
FIG. 10 illustrates a process flow chart used in an embodiment of the present invention.
Figure 18:
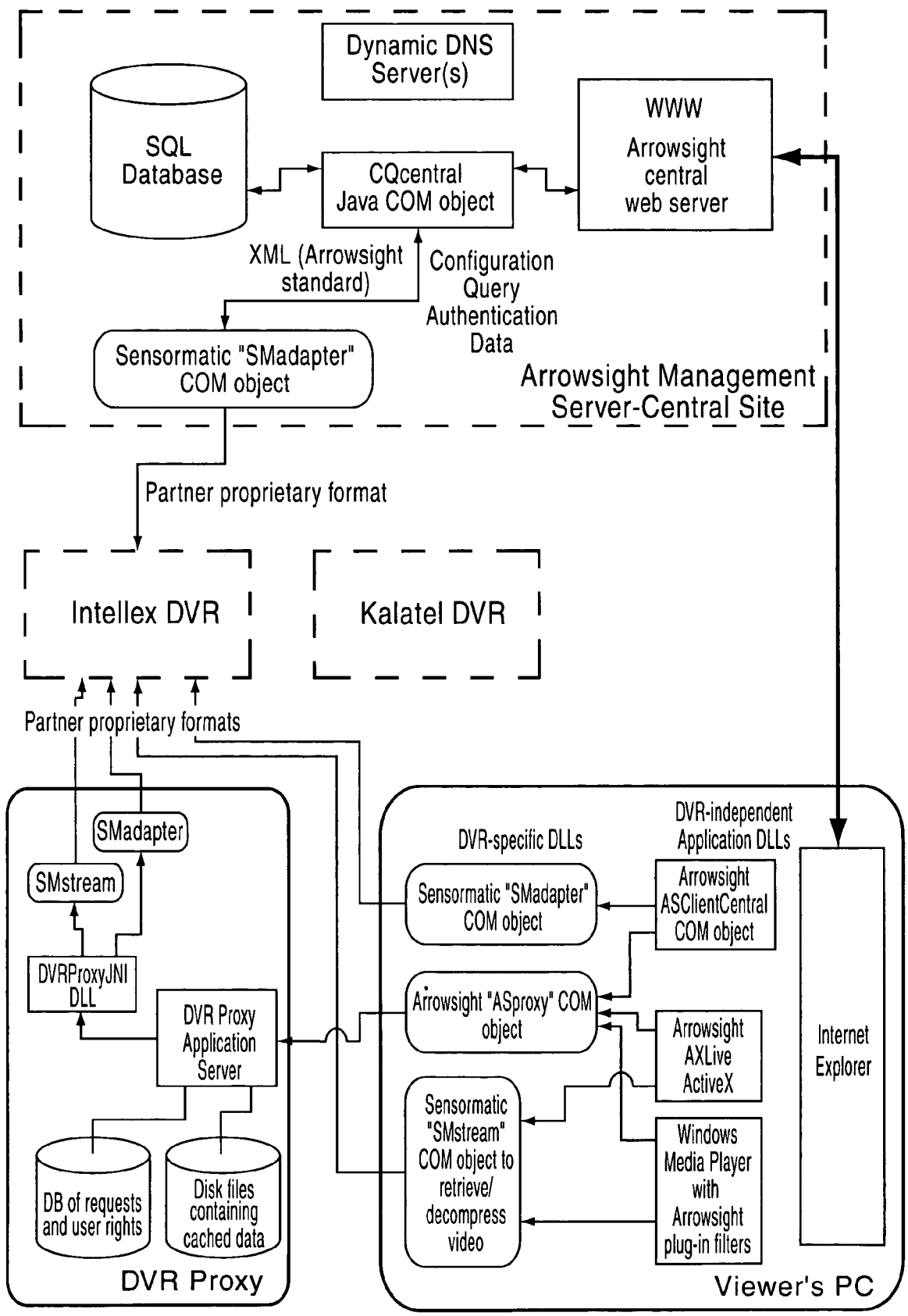
FIG. 18 shows a detailed block diagram illustrating exemplary functional interrelationships between various components, both hardware and software, of the present invention.

In accordance with an embodiment of the present invention, FIG. 10 illustrates the basic audit report generation methodology of the present invention. This methodology optionally further includes creating periodic audit reports, as described below in greater detail. The audit reports may, for example, be generated daily, weekly, monthly or at other desired periods.

In general, the process includes an auditor remotely accessing video information from one or more cameras at each of a set of stores or other locations, and examining the video information to determine whether certain predefined criteria are met. Based on this examination, the auditor designates the audited video as pass or fail 1002. The set of stores, time intervals, cameras, and criteria to be examined, known as audit items, are stored in an audit execution checklist, also known as an audit spreadsheet. For each audit item, the auditor is able to select a button, hyperlink or other selectable tool in the audit spreadsheet to view the video that is needed to classify an audit item 1002.

Thereafter, a periodic audit report, such as a daily audit report summarizing the audit items and their classifications is created. Further, all periodic reports may be collated into a summary report using predetermined or client selected criteria 1004, which may include comparing a predetermined time frame of previous audit reports with the current audit reports. The summary reports may include summary scores or percentages of Pass/Fail classifications summarized, for example, by location, time period, audit or guard tour type, and tour stop. The collated report is reviewed, for example, to verify the accuracy of the audit or to verify that all the audits are complete 1006.

The final report is then transmitted to the designated recipients 1008. In one embodiment, the audit report is transmitted using e-mail. The audit report is transmitted in a format which allows the receiving party to view the video associated with any audited item and/or its classification by using a single mouse click on its associated button or hyperlink contained in the report.

In one embodiment, a user is able to receive numerous different reports, for example, reports for corporate management, regional management and store management. The corporate management reports permit corporate management to quickly determine which stores are in compliance, by issuing pass or fail grades to stores based upon averages of established audit compliance percentages. The regional management reports permit regional management to determine the store-by-store compliance percentages with the scoring of individual video audits, for example. The store management reports permit store managers to view the score per audit for individual stores/facilities. All users are able to select the Fail button on Store Audit Procedures report, which provides the hyperlink to access the saved video or stills for the non-compliant audits.

FIGS. 11-17 illustrate screens/windows that may be displayed during the process shown in FIG. 10. FIG. 11, for example, shows a screen shot of an embodiment of the present invention, in which a user reviews an Audit Checklist prior to sending a report to the client. The Audit Checklist contains a list of completed audits, and may be accessed by entering the appropriate search criteria in the Checklist Search Criteria screen of FIG. 11. After selecting the Generate Checklist button, the user is presented with the Checklist for that client.

Once the Audit Checklist is generated, the user may review each audit for accuracy. The Audit Checklist illustrated in the screen shot of FIG. 12 displays all the information in the Audit Spreadsheet, including: Audit Source, Audit Type, Location, Date, Start Time, Stop Time, Camera/Device, and Status, among others. It also identifies the auditor/guard who made the pass/fail classification, so that supervisors may examine the work of the auditor/guards. The user may make appropriate changes to a particular audit by, for example, deleting rows and/or adding, changing or deleting items from the audit. Once the audit review is complete, the user may transmit the report to the client, for example, by selecting the Email Report button.

The report that the client user receives may be, for example, an HTML-based report, which may be sent to the client as an attachment to an email. FIG. 14 shows a screen shot that allows the person sending the report to select which users should receive it from a list of users who are pre-approved to receive the reports. FIG. 13 shows a screen shot that is used to edit a user's properties, including whether they are eligible to receive audit reports. The Audit Report may be broken down into sections, such as, for example, the Audit Report (Overview) Screen 70 shown in FIG. 15, the Audit Report (Store Reports) Screen 80, shown in FIG. 16, and the Audit Reports (Video links) Screen 90, shown in FIG. 17.

Users and clients alike have the capability of managing their Saved Video and Still images on their personal computers by selecting the Save Locally icon. A user may send links to Live or Saved Video, or to Stills and Clips to other authorized users. For example, if an incident that warrants further investigation is noticed by a regional director, the director only needs to select the Email Links icon to send the link to the appropriate party. This feature of the present invention eliminates the need to send large video files via email.

Summary Scores in Audit Reports

In one embodiment, the reports described above contain a summary score for each audit type at each store over a certain date range. This score is typically a percentage that reflects either the percentage of the audit items of that type that were marked as passing, or the percentage of the days in the reporting period on which the audit passed. Computation of these scores may require special handling of situations where multiple audit items of a single type may occur on a single day but should only be counted once for the day, where no audit item occurs on a given day, or where no video is present to make a classification. This is performed in one embodiment as follows.

To determine the pass percentage of a particular audit type for a specified time period at a specified location, the computation depends on the values in the audit type fields for SummarizationDays and NoItemsClassification. These values are selected by the user when defining the audit type. The SummarizationDays field may be either NULL or 1. If it is NULL, this indicates that each audit item should be treated as an individual data point contributing towards the score. If it is 1, this indicates that all audit items occurring on the same day should be grouped together to form a single data point contributing towards the score.

The NoItemsClassification field is used only for audit types with SummarizationDays field value of 1. It denotes the default classification (for example, "pass") of a day that contains no audit items.

The SummarizationDays and NoItemsClassification fields give the user the flexibility to compute percentages for data-driven audits such as "days on which the back door was propped open." Such an audit typically has a SummarizationDays field value set to 1 and NoItemsClassification field value set to "Pass." This means that if the door was propped open three times during a given day, the day would be counted as a single failing day, while if the door was not opened at all during a given day, the day would be counted as a passing day. A guard tour typically has SummarizationDays field set to NULL.

For audit types with a NULL value in the SummarizationDays field, the computation is as follows:
1. Let rsItems be the set of audit items of this type at this location within the time period.
2. Let rsValid be the subset of rsItems that have been classified as Pass or Fail, i.e., the items that are not Unknown, No Video, or Unexamined.
3. Let rsPass be the subset of rsValid that have been classified as Pass.
4. The pass percentage is $\|rsPass\|/\|rsValid\|$ if rsValid has at least one member. If there are no members, however, the pass percentage is unknown and should be displayed as "Not Avail."

For audit types with a value of 1 in the SummarizationDays field, the computation is as follows:
1. Classify each day in the reporting period as pass/fail/unknown according to the algorithm in the paragraph below.
2. The pass percentage is (# of days in the period classified as pass)/(# of days in the period classified as pass or fail). If the divisor is 0, i.e., all the days are classified as unknown, the pass percentage is unknown and should be displayed as "Not Avail."

To classify each day in the reporting period as pass/fail/unknown:
1. Let rsItems be the set of audit items of this type at this location on this day.
2. If rsItems is empty, the day should be classified as the value in the NoItemsClassification field for that audit type.
3. If any of the items in rsItems are classified as fail, the day should be classified as fail.
4. Otherwise, if any of the items in rsItems are Unknown, No Video, or Unexamined, the day should be classified as unknown.
5. In all other instances, the day should be classified as pass.

The above algorithms allow generation of the pass percentages for each audit type at a specific store within a period. To generate the overall pass statistics for a given store, the average of all of its pass percentages for each of its audit types that were not assigned a "Not Avail" pass percentage are computed.

In summary, numerous benefits have been described, which result from employing the concepts of the present invention. The foregoing description of preferred embodiments of the invention has been presented for purposes of illustration and description and is not intended to be exhaustive or to limit the invention to the precise form disclosed. Obvious modifications or variations are possible in light of the above teachings. The embodiments were chosen and described in order to best illustrate the principles of the invention and its practical application, and to thereby enable one of ordinary skill in the art to best utilize the invention in various embodiments and with various modifications as are suited to the particular use contemplated. For example, while the method and system of the present invention have been described in terms of a networked computer system, the invention may be practiced in a distributed networking environment such as, for example, a Local Area Network (LAN), Virtual Private Network (VPN), intranet, or the Internet. It is intended that the scope of the invention be defined by the claims appended hereto.

The invention claimed is:

1. A method for performing remote video audits via a computer having a processor, the method comprising:
creating an audit spreadsheet containing a plurality of audit items;
selecting at least one of the plurality of audit items;
obtaining video information regarding the selected audit item, wherein the video information includes video stills;
entering a classification for the selected audit item based on reviewing the video information;
storing the selected audit item after the classification is entered;
calculating, via the processor, an audit item compliance percentage for the selected audit item in one or more reports based on the classification of one or more such stored audit items; and
calculating, via the processor, an overall compliance percentage for the audit based on an average of the audit item compliance percentages.

2. The method of claim 1, wherein the classification is accompanied by a predefined note.

3. The method of claim 1, wherein the obtained video information is video stills obtained via a spreadsheet hyperlink.

4. The method of claim 1, wherein the obtained video information is video clips obtained via a spreadsheet hyperlink.

5. The method of claim 1, wherein the plurality of audit items is selected from a group consisting of location, time interval, camera, and device mapping to camera.

6. A method for performing remote video audits via a computer having a processor, the method comprising:
selecting an audit item from an audit spreadsheet;
obtaining video information regarding the selected audit item, wherein the video information includes video stills;
entering a classification for the selected audit item based on reviewing the video information;
storing the selected audit item after the classification is entered;
calculating, via the processor, an audit item compliance percentage for the selected audit item in one or more reports based on an average of the classification of one or more such stored audit items; and
calculating, via the processor, an overall compliance percentage for the audit based on an average of the audit item compliance percentages.

7. The method of claim 6, wherein the classification is accompanied by a predefined note.

8. The method of claim 6, wherein the video information comprises video stills.

9. The method of claim 6, wherein the video information comprises video clips.

10. The method of claim 6, further comprising selecting a next audit item from the audit spreadsheet.

11. The method of claim 6, further comprising:
generating a report, including information describing the at least one audit item and the classification; and
transmitting the report to at least one designated recipient.

12. The method of claim 11, wherein the report is a summary report for a plurality of items.

13. The method of claim 6, wherein the classification is selected form a group consisting of Pass, Fail, Not Audited, Don't know, and No Video.

14. A method for performing remote video guard tours via a computer having a processor, the method comprising:
selecting a guard tour from a list of available guard tours;
obtaining image information for a next stop on the selected guard tour, wherein the image information includes video stills;
reviewing the image information;
entering a classification for the guard tour stop based on the review;
storing the selected audit item after the classification is entered;
calculating, via the processor, a guard tour compliance percentage for the selected audit item in one or more reports based on the classification of one or more such stored audit items; and
calculating, via the processor, an overall compliance percentage for the audit based on an average of the guard tour compliance percentages.

15. The method of claim 14, wherein the classification is accompanied by a predefined note.

16. The method of claim 14, further comprising selecting a next guard tour from the list of available guard tours.

17. The method of claim 14, further comprising:
generating a report, including information describing the at least one guard tour and the classification; and
transmitting the report to at least one designated recipient.

18. The method of claim 17, wherein the report is a summary report for a plurality of items.

19. The method of claim 14, wherein the classification is selected form a group consisting of Pass, Fail, Not Audited, Don't know, and No Video.

20. A method for performing remote video audits via a computer having a processor, the method comprising:
creating an audit spreadsheet containing a plurality of audit items, wherein the audit spreadsheet includes an audit execution checklist;
selecting at least one of the plurality of audit items;
obtaining video information regarding the selected audit item, wherein the video information includes video stills;
entering a classification for the selected audit item based on reviewing the video information;
storing the selected audit item after the classification is entered;
calculating, via the processor, an audit item compliance percentage for the selected audit item in one or more reports based on the classification of one or more such stored audit items; and
calculating an overall compliance percentage for the audit based on an average of the audit item compliance percentages.

* * * * *